United States Patent
Kang et al.

(10) Patent No.: US 12,530,286 B2
(45) Date of Patent: Jan. 20, 2026

(54) MEMORY CONTROLLER, OPERATING METHOD THEREOF, AND STORAGE DEVICE FOR ENSURING INITIALIZATION OF SECURITY PARAMETER

(71) Applicant: Samsung Electronics Co., Ltd., Suwon-si (KR)

(72) Inventors: Seunghoon Kang, Suwon-si (KR); Mingon Shin, Suwon-si (KR); Seungjae Lee, Suwon-si (KR); Yejun Jeong, Suwon-si (KR); Byungchan Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/769,815

(22) Filed: Jul. 11, 2024

(65) Prior Publication Data

US 2025/0225069 A1    Jul. 10, 2025

(30) Foreign Application Priority Data

Jan. 8, 2024   (KR) .................. 10-2024-0003116

(51) Int. Cl.
   G06F 12/00    (2006.01)
   G06F 12/02    (2006.01)

(52) U.S. Cl.
   CPC .................. G06F 12/023 (2013.01)

(58) Field of Classification Search
   None
   See application file for complete search history.

(56) References Cited

U.S. PATENT DOCUMENTS

| | | | |
|---|---|---|---|
| 11,385,831 B2 | 7/2022 | Kim et al. | |
| 11,386,019 B1 | 7/2022 | Chang et al. | |
| 2003/0212875 A1* | 11/2003 | Gresham | G06F 12/023 |
| | | | 711/170 |
| 2009/0276602 A1* | 11/2009 | Chedru | G06F 12/023 |
| | | | 711/170 |
| 2013/0036287 A1* | 2/2013 | Chu | G06F 13/16 |
| | | | 711/170 |
| 2016/0203086 A1 | 7/2016 | Ng et al. | |
| 2020/0167504 A1* | 5/2020 | Oh | G06F 21/73 |
| 2022/0350528 A1 | 11/2022 | Jeong | |
| 2023/0325541 A1 | 10/2023 | Hubis | |

FOREIGN PATENT DOCUMENTS

| | | | |
|---|---|---|---|
| CN | 107145308 B | 6/2021 | |
| KR | 10-2023-0067485 A | 5/2023 | |
| WO | WO-2024245536 A1 * | 12/2024 | G06F 3/0635 |

\* cited by examiner

Primary Examiner — Jared I Rutz
(74) Attorney, Agent, or Firm — Fish & Richardson P.C.

(57) ABSTRACT

Provided are memory controllers, operating methods thereof, and storage devices for ensuring initialization of a security parameter. The memory controller includes a buffer memory including a plurality of memory pools, a buffer allocator configured to allocate a security memory pool among the plurality of memory pools, and a processor configured to modify, based on a cryptography algorithm, secret information received from a host and control the buffer memory to store the modified secret information in the security memory pool.

20 Claims, 12 Drawing Sheets

MEMORY CONTROLLER, OPERATING METHOD THEREOF, AND STORAGE DEVICE FOR ENSURING INITIALIZATION OF SECURITY PARAMETER

CROSS-REFERENCE TO RELATED APPLICATION

This application is based on and claims priority under 35 U.S.C. § 119 to Korean Patent Application No. 10-2024-0003116, filed on Jan. 8, 2024, in the Korean Intellectual Property Office, the disclosure of which is incorporated by reference herein in its entirety.

BACKGROUND

The inventive concepts relates to electronic devices, and more particularly, to memory controllers, operating methods thereof, and storage devices for ensuring initialization of a security parameter.

Semiconductor memory devices may be classified into volatile memories such as DRAMs and SRAMs and nonvolatile memories such as EEPROMs, FRAMs, PRAMs, MRAMs, and flash memories. A volatile memory device loses stored data when power supply thereto is interrupted, whereas a nonvolatile memory device retains stored data even when power supply thereto is interrupted.

Devices using nonvolatile memories include, for example, MP3 players, digital cameras, mobile phones, camcorders, flash cards, and solid state disks (SSDs). As the number of devices using a nonvolatile memory as a storage device has increased, the capacity of nonvolatile memories has also increased rapidly.

When secret information such as a user's password is used in a storage device, a buffer is allocated in the storage device. After the secret information is used, it is necessary to initialize the secret information in the allocated buffer in order to protect the secret information. However, when an operation of initializing the secret information is omitted, the security may become vulnerable.

SUMMARY

The inventive concepts provide memory controllers, operating methods thereof, and storage devices for ensuring initialization of a security parameter.

According to some aspects of the inventive concepts, there is provided a memory controller including a buffer memory including a plurality of memory pools, a buffer allocator configured to allocate, based on a first control signal, a security memory pool to store modified secret information among the plurality of memory pools, and a processor configured to receive, from a host, a command including secret information, output the first control signal to the buffer allocator based on the command, modify the secret information based on a cryptography algorithm, and output, to the buffer memory, a second control signal indicating to store a security parameter including the modified secret information in the security memory pool.

According to some aspects of the inventive concepts, there is provided an operating method of a memory controller including receiving secret information from a host, allocating a security memory pool to store the secret information among a plurality of memory pools of a buffer memory, modifying the secret information based on a cryptography algorithm, and storing a security parameter including the modified secret information in the security memory pool.

According to some aspects of the inventive concepts, there is provided a storage device including a nonvolatile memory including a plurality of memory cells, and a memory controller configured to receive, from a host, a command including secret information and allocate, based on the command, a security memory pool to temporarily store the secret information.

BRIEF DESCRIPTION OF THE DRAWINGS

Embodiments will be more clearly understood from the following detailed description taken in conjunction with the accompanying drawings in which.

DETAILED DESCRIPTION OF THE EMBODIMENTS

Hereinafter, embodiments will be described in detail with reference to the accompanying drawings.

Any or all of the elements described with reference to the figures may communicate with any or all other elements described with reference to figures. For example, any element may engage in one-way and/or two-way and/or broadcast communication with any or all other elements in the figures, to transfer and/or exchange and/or receive information such as but not limited to data and/or commands, in a manner such as in a serial and/or parallel manner, via a bus such as a wireless and/or a wired bus (not illustrated). The information may be in encoded various formats, such as in an analog format and/or in a digital format.

Figure 1:
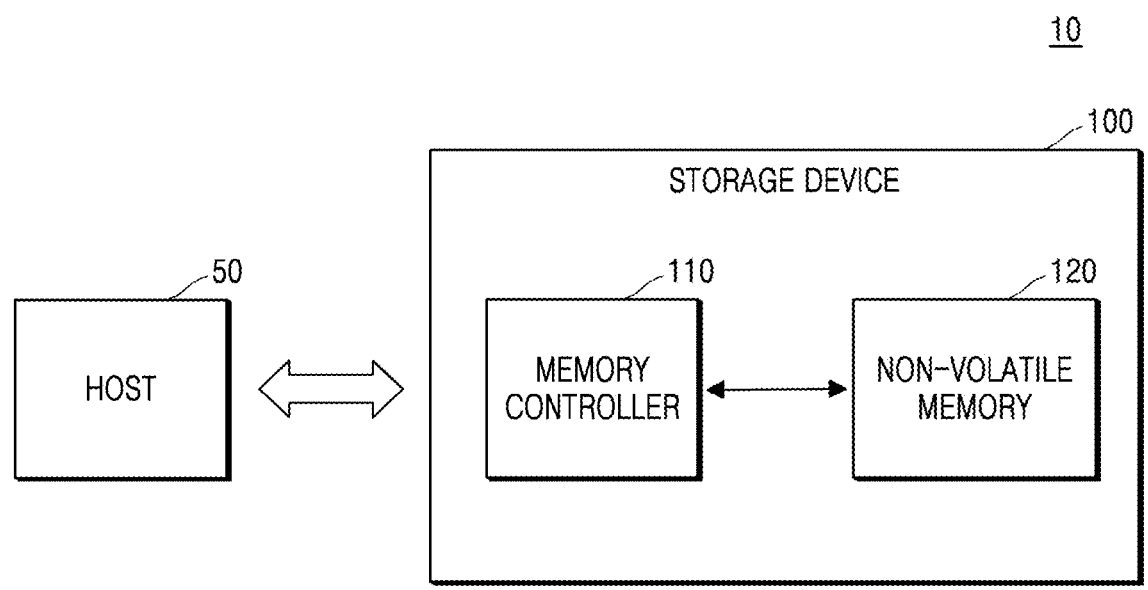
FIG. 1 is a block diagram of a system according to some example embodiments.

FIG. 1 is a block diagram of a system 10 according to some example embodiments.

Referring to FIG. 1, a system 10 may include a host 50 and a storage device 100.

The host 50 may communicate with the storage device 100 through an interface. Here, the interface may be implemented as, for example, NVMe, NVMe Management Interface (NVMe MI), or NVMe over Fabric (NVMe-oF). The host 50 may provide the storage device 100 with a write request for requesting to store data in the storage device 100. Also, the host 50 may provide the storage device 100 with data and a logical address for identifying the data. In some example embodiments, the logical address may be included in the write request. The host 50 may provide the storage device 100 with a read request for requesting to provide data stored in the storage device 100. Also, the host 50 may provide the storage device 100 with a logical address for identifying the data. In some example embodiments, the logical address may be included in the read request. The host 50 may provide the storage device 100 with a security request for requesting to store secret data (or secret information) in the storage device 100. The secret information may include a user's password or the like. The security request may include a security command including "send" or "receive" and secret information (e.g., the user's password). The host 50 may provide the storage device 100 with a clear check request for requesting to check whether the secret information is initialized. The host 50 may provide the storage device 100 with a format request for requesting the format of a nonvolatile memory 120.

The storage device 100 may include a memory controller 110 and the nonvolatile memory 120. The memory controller 110 and the nonvolatile memory 120 may be integrated into one semiconductor device. For example, the memory controller 110 and the nonvolatile memory 120 may be integrated into a single semiconductor device to construct a memory card, a PC card, a compact flash card, a smart media card, a memory stick, a multimedia card, an SD card, a universal flash storage device, or a solid state disk/drive (SSD).

The memory controller 110 may communicate with the host 50 through various standard interfaces. For example, the memory controller 110 may include an interface circuit (not illustrated), and the interface circuit may provide various standard interfaces between the host 50 and the memory controller 110. The standard interfaces may include various interface methods such as Advanced Technology Attachment (ATA), Serial ATA (SATA), external SATA (e-SATA), Small Computer Small Interface (SCSI), Serial Attached SCSI (SAS), Peripheral Component Interconnection (PCI), PCI express (PCI-E), IEEE 1394, Universal Serial Bus (USB), Secure Digital (SD) card, Multimedia Card (MMC), embedded Multimedia Card (eMMC), Universal Flash Storage (UFS), and Compact Flash (CF) card interfaces.

In response to a request (e.g., a write request or a read request) received from the host 50, the memory controller 110 may control the nonvolatile memory 120 to read data stored in the nonvolatile memory 120 or write (or program, etc.) data into the nonvolatile memory 120. Particularly, the memory controller 110 may control a write operation (or a program operation), a read operation, and an erase operation on the nonvolatile memory 120 by providing commands/ addresses and/or control signals to the nonvolatile memory 120. Also, data to be written and read data may be transmitted/received between the memory controller 110 and the nonvolatile memory 120.

The memory controller 110 may control the characteristics of the nonvolatile memory 120 or a series of internal operations (e.g., performance control, merge, wear leveling, and the like) required for efficient management of the nonvolatile memory 120.

In some example embodiments, in response to the security request or the format request, the memory controller 110 may modify the secret information by using a cryptography algorithm. Also, the memory controller 110 may temporarily store the modified secret information internally. For this purpose, the memory controller 110 may allocate a security memory pool for storing the modified secret information, which is different from a memory pool for storing general data or information. The memory controller 110 may control the nonvolatile memory 120 to store data in the nonvolatile memory 120.

The nonvolatile memory 120 may include a plurality of memory cells. The plurality of memory cells may have various threshold voltage distributions depending on programmed data. For example, a single-level cell storing one bit per memory cell may have a threshold voltage distribution corresponding to an erase state or a threshold voltage distribution corresponding to a program state. As another example, a multi-level cell storing two bits per memory cell may have a threshold voltage distribution corresponding to an erase state, a threshold voltage distribution corresponding to a first program state, a threshold voltage distribution corresponding to a second program state, or a threshold voltage distribution corresponding to a third program state. As another example, a triple-level cell storing three bits per memory cell may have eight threshold voltage distributions depending on program states. However, the inventive concepts are not limited thereto. One threshold voltage distribution may correspond to a particular state of a memory cell.

Although not illustrated, the storage device 100 may further include a volatile memory such as a dynamic random access memory (DRAM).

According to some example embodiments, the security of the storage device 100 may be improved by checking whether the secret information stored in the memory controller 110 is initialized (or cleared).

As such, by using the above example embodiments, data may be more securely stored and the ability of malicious actors to access sensitive data, confidential data, etc., of the storage device may be decreased and/or have reduced ability. Therefore, the improved devices and methods overcome the deficiencies of the conventional devices and methods related to encryption and use of secret information while reducing resource consumption and increasing data clarity/ security. For example, by using the disclosed methods, through such a data management process, the storage device of the example embodiments may reliably remove and/or obfuscate secret information from vulnerable locations, and as such, it may be possible and require fewer resources, such as memory access and/or power to drive circuitry to protect stored data.

Figure 2:
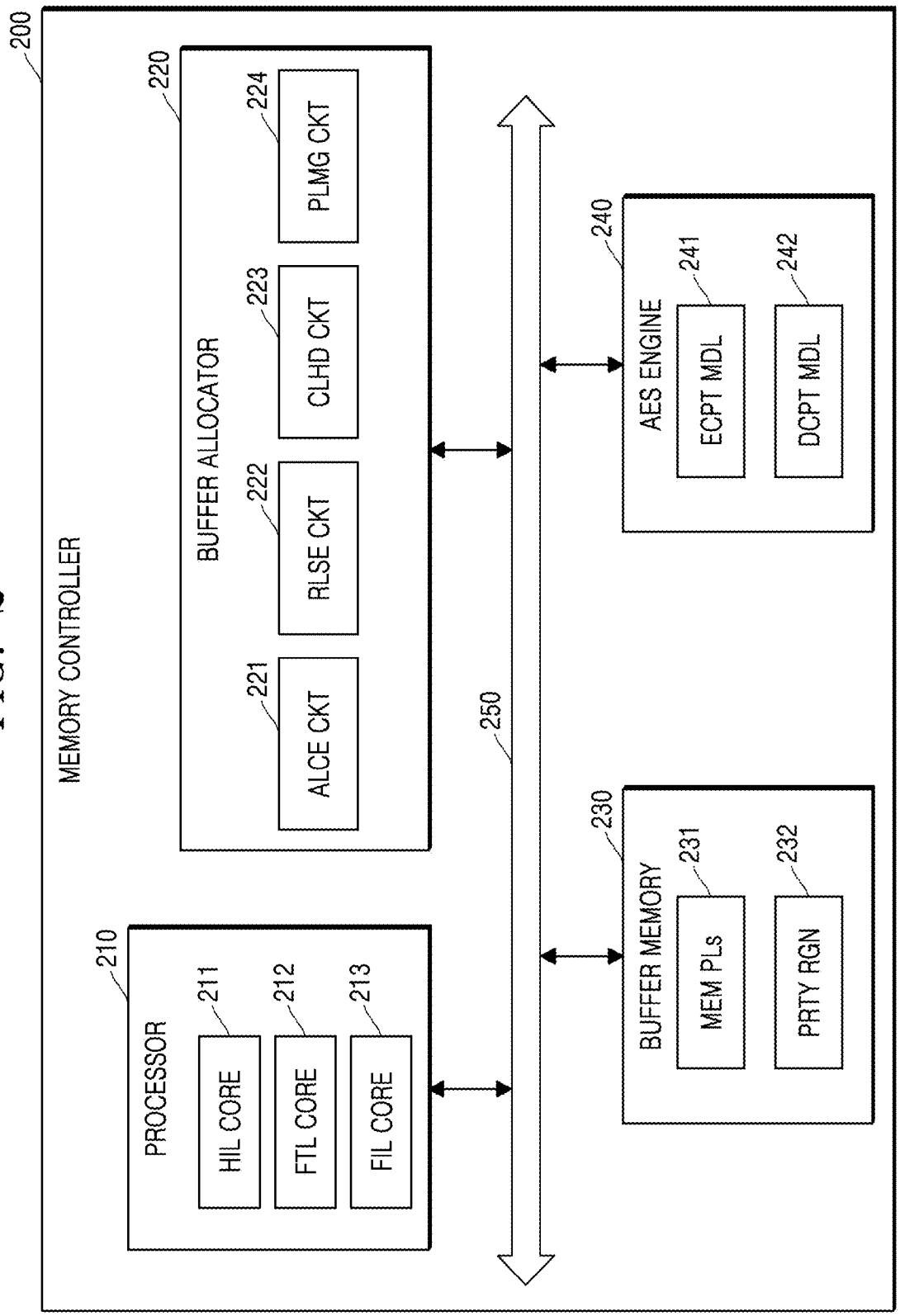
FIG. 2 is a block diagram of a memory controller according to some example embodiments.

FIG. 2 is a block diagram of a memory controller 200 according to some example embodiments.

Referring to FIG. 2, in some example embodiments, a memory controller 200 may be configured to receive a command including secret information from a host and may be configured to allocate a security memory pool to temporarily store the secret information based on the command. For this purpose, the memory controller 200 may include a processor 210, a buffer allocator 220, a buffer memory 230, and an advanced encryption standard (AES) engine 240. The processor 210, the buffer allocator 220, the buffer memory 230, and the AES engine 240 may communicate through a bus 250.

The processor 210 may control operations of other components constituting the memory controller 200. The processor 210 may include one or more central processing unit (CPU) cores. For example, the processor 210 may be implemented as a multi-core processor including a plurality of cores and may have a structure including a plurality of software layers such as a host interface layer (HIL), a flash translation layer (FTL), and a flash interface layer (FIL). The plurality of cores may respectively and separately perform different operations required to process one access command. For example, the plurality of cores may respectively perform operations of the HIL, the FTL, and the FIL, and inter-layer communication may be performed by exchanging messages between the plurality of cores. The HIL may convert signals (e.g., requests) or information received from the host 50 into signals or information usable by the nonvolatile storage device 100. For example, the HIL may convert (or redirect) a logical block address (LBA) of the host 50 into a logical page number (LPN). The FTL may provide or map the LPN to a physical address in the nonvolatile memory 120. In some example embodiments, the processor 210 may include an HIL core 211, an FTL core 212, and an FIL core 213. The HIL core 211 may control a host interface and process an access command from the host 50. In some example embodiments, the HIL core 211 may call to allocate a memory pool based on secret information and a security command including "send". The HIL core 211 may modify (or convert, replace, and the like) the secret information by using a cryptography algorithm. The FTL core 212 may perform address mapping between a logical address received from the host 50 and a physical address of the nonvolatile memory 120. The FIL core 213 may manage a write operation and a read operation on the nonvolatile memory 120. In some example embodiments, the FTL core 212 and the FIL core 213 may manage a write operation to store the modified secret information in the nonvolatile memory 120.

The buffer allocator 220 may allocate at least one memory pool among a plurality of memory pools 231 of the buffer memory 230 or may release an allocated memory pool. In some example embodiments, the buffer allocator 220 may include an allocation circuit 221, a release circuit 222, a clear handler circuit 223, and a pool management circuit 224.

The allocation circuit 221 may find (or retrieve) an available memory pool from the pool management circuit 224 in response to an allocation request from the HIL core 211. For example, the allocation circuit 221 may retrieve a start address of an available memory pool from the pool management circuit 224. When an available memory pool is retrieved, the allocation circuit 221 may output a start address of the retrieved memory pool. The start address may be a first address among a plurality of physical addresses representing the memory pool. The start address may also be referred to as a base address. The allocation circuit 221 may retrieve and output a size of the available memory pool in the pool management circuit 224 together with a start address of the retrieved memory pool and may output a security flag for specifying the retrieved memory pool. The allocated memory pool may be referred to as a security memory pool. A security parameter may be stored in the security memory pool. The security parameter may include modified secret information, an input value of a cryptography algorithm, and a symmetric key used for an encryption operation and a decryption operation on user data. The security parameter may be used to perform a security operation including an encryption operation, a decryption operation, or the like. The security flag transmitted in allocation may be managed as an indicator by the pool management circuit 224.

When the use of the security parameter is completed and the HIL core 211 requests a release by including the start address, the release circuit 222 may find the security memory pool from the pool management circuit 224 and may release the retrieved security memory pool to return to an allocatable state.

When the security memory pool is released, the clear handler circuit 223 may generate and output clear data with reference to the corresponding security flag. The clear data may include bit values for initializing the value of the security parameter. That is, the clear data may be stored in the released security memory pool. In some example embodiments, each of the bit values may be '0'; however, the inventive concepts are not limited thereto.

The pool management circuit 224 may manage the plurality of memory pools 231. In general, the pool management circuit 224 may separately manage a memory pool allocated to temporarily store user data or the like and a memory pool allocated as a security memory pool. The pool management circuit 224 may manage an allocated memory pool and an unallocated (or released) memory pool. The pool management circuit 224 may manage the size of each of the plurality of memory pools 231, the addresses of the plurality of memory pools 231, and the segment type of the plurality of memory pools 231. In some example embodiments, the pool management circuit 224 may store the start address and size of a memory pool to be allocated as a security memory pool.

The buffer memory 230 may temporarily store various data and information received from the host 50. Also, the buffer memory 230 may temporarily store various data received from the nonvolatile memory 120. The buffer memory 230 may include a plurality of memory pools 231 and a parity region 232. A parity indicating whether the security memory pool is cleared (or initialized) may be stored in the parity region 232. In some example embodiments, when the security parameter is used and the security memory pool is released and returned, the buffer memory 230 may generate a parity based on the bit values of the clear data and may store the parity in the parity region 232.

The AES engine 240 may perform encryption and decryption of data using an AES algorithm and may include an encryption module 241 and a decryption module 242. FIG. 2 illustrates the encryption module 241 and the decryption module 242 implemented as separate modules; however, unlike this, a single module capable of performing both encryption and decryption may be implemented in the AES engine 240.

The AES engine 240 may receive first data from the buffer memory 230. The encryption module 241 may generate second data by encrypting the first data received from the buffer memory 230 by using an encryption key. The second data may be transmitted from the AES engine 240 to the buffer memory 230 and stored in the buffer memory 230.

Also, the AES engine 240 may receive third data from the buffer memory 230. The third data may be data encrypted with the same encryption key as the encryption key used to encrypt the first data. The decryption module 242 may generate fourth data by decrypting the third data received from the buffer memory 230 with the same encryption key as the encryption key used to encrypt the first data. The fourth data may be transmitted from the AES engine 240 to the buffer memory 230 and stored in the buffer memory 230.

In some example embodiments, the AES engine 240 may perform a security operation by using the security parameter stored in the buffer memory 230. For example, the security operation may be an encryption or decryption operation using the above encryption key. As another example, the security operation may be an operation of changing the above encryption key.

Figure 3:
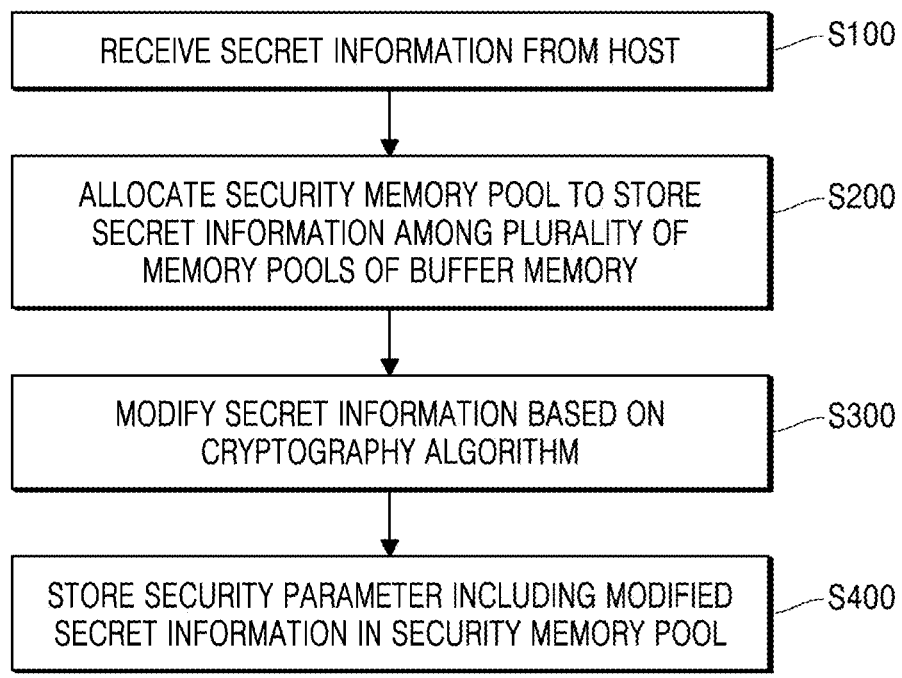
FIG. 3 is a flowchart for describing an operating method of a memory controller according to some example embodiments.

FIG. 3 is a flowchart for describing an operating method of a memory controller 200 according to some example embodiments.

Referring to FIGS. 2 and 3, an operation S100 of receiving secret information from the host 50 may be performed. For example, the memory controller 200 may receive secret information (for example, a security command and a user's password) from the host 50.

An operation S200 of allocating a security memory pool to store the secret information among the plurality of memory pools 231 of the buffer memory 230 may be performed. For example, the buffer allocator 220 may allocate a security memory pool in the buffer memory 230.

An operation S300 of modifying the secret information based on a cryptography algorithm may be performed. For example, the processor 210 may change the user's password by using a cryptography algorithm.

An operation S400 of storing a security parameter including the modified secret information in the security memory pool may be performed. For example, the processor 210 may output a security parameter and a command/address to the buffer memory 230, and the buffer memory 230 may store the security parameter in the security memory pool.

Figure 4:
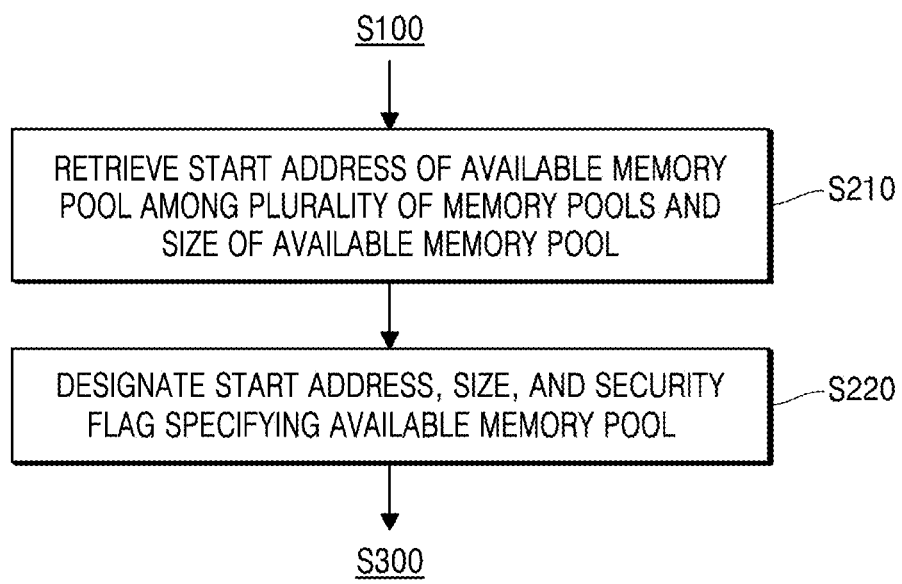
FIG. 4 is a flowchart for describing some example embodiments of allocating a security memory pool according to the inventive concepts.
Figure 5:
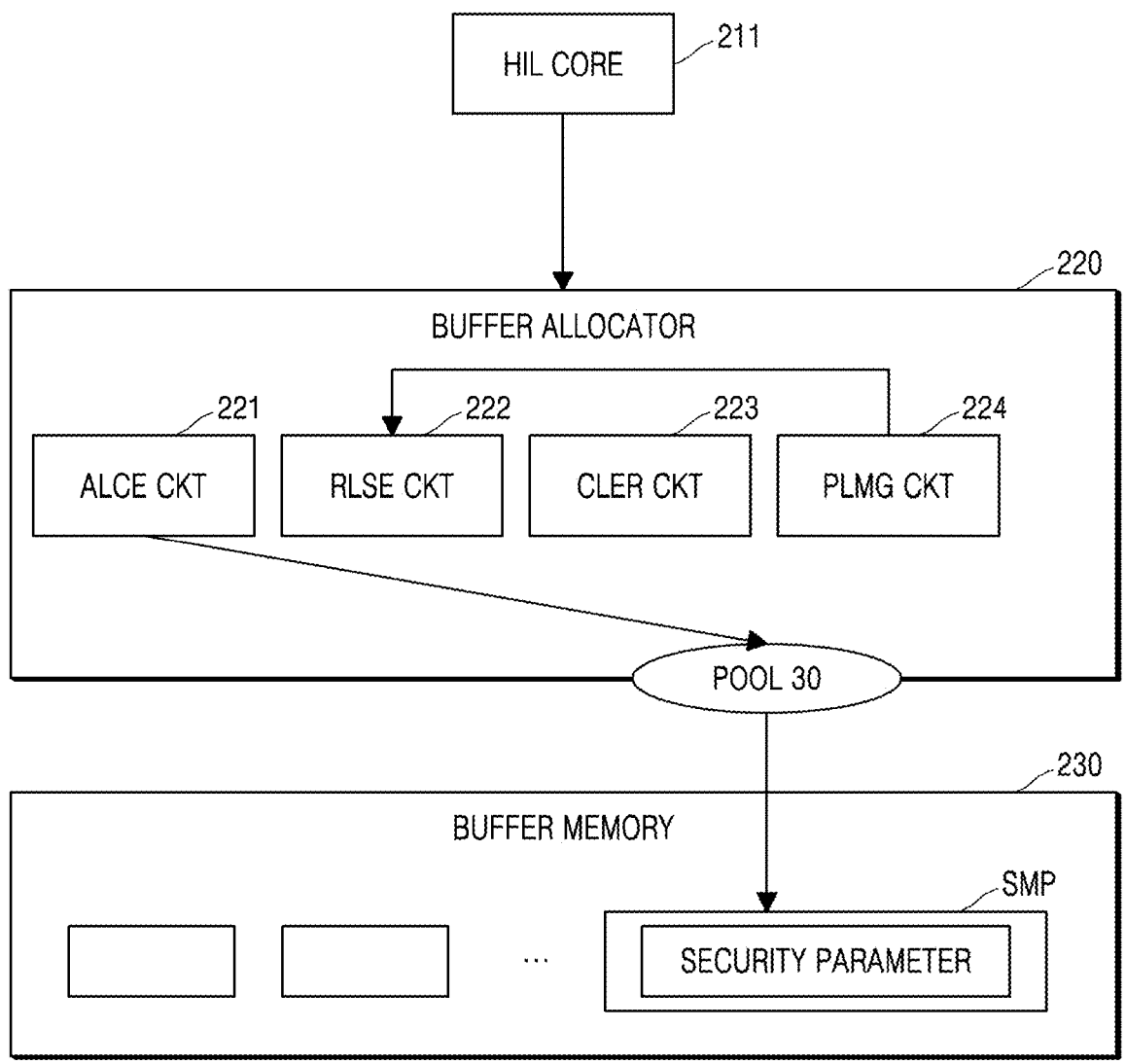
FIG. 5 is a block diagram of the embodiment of FIG. 4.

FIG. 4 is a flowchart for describing some example embodiments of allocating a security memory pool SMP according to the inventive concepts, and FIG. 5 is a block diagram of the embodiment of FIG. 4.

Referring to FIG. 4, in some example embodiments of the operation S200, the operation S200 may include an operation S210 and an operation S220. In the operation S210, a start address of an available memory pool among a plurality of memory pools and a size of the available memory pool may be retrieved. In the operation S220, the start address, the size, and a security flag specifying the available memory pool may be designated.

Referring to FIG. 5, the HIL core 211 may output a first control signal to the buffer allocator 220 to request the buffer allocator 220 to allocate a memory pool. Also, the HIL core 211 may modify the secret information based on the cryptography algorithm. The pool management circuit 224 may manage the physical addresses of the plurality of memory pools 231 and the sizes of the plurality of memory pools 231. The allocation circuit 221 may retrieve an available memory pool in the pool management circuit 224. For example, the available memory pool may be a memory pool 30 (POOL 30). The allocation circuit 221 may allocate a security memory pool SMP by designating a start address corresponding to the first address among the physical addresses of an available memory pool in the pool management circuit 224, a size of the available memory pool, and a security flag specifying the available memory pool. For example, the allocation circuit 221 may designate a start address of memory pool 30 (POOL 30), a size of memory pool 30 (POOL 30), and a security flag. The memory pool 30 (POOL 30) may be allocated as the security memory pool SMP. Also, the HIL core 211 may output, to the buffer memory 230, a second control signal indicating to store a security parameter (SECURITY PARAMETER) including the modified secret information. The security parameter (SECURITY PARAMETER) may be stored in the security memory pool SMP. The security parameter (SECURITY PARAMETER) may include, for example, a credential security parameter (CSP) or a sensitive security parameter (SSP).

Figure 6:
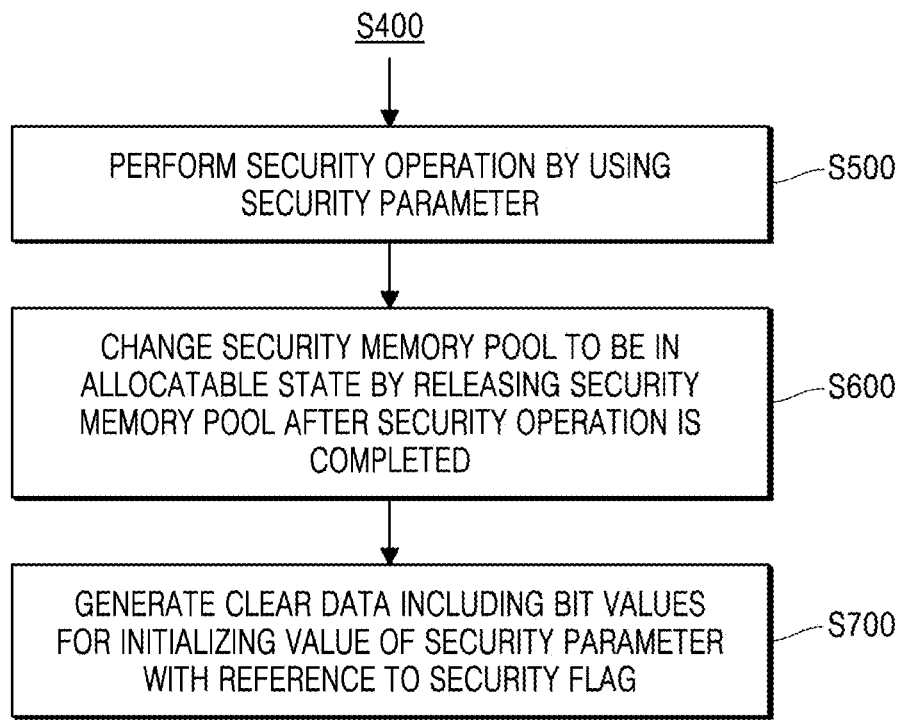
FIG. 6 is a flowchart for describing some example embodiments of releasing an allocated security memory pool and initializing a security parameter according to the inventive concepts.
Figure 7:
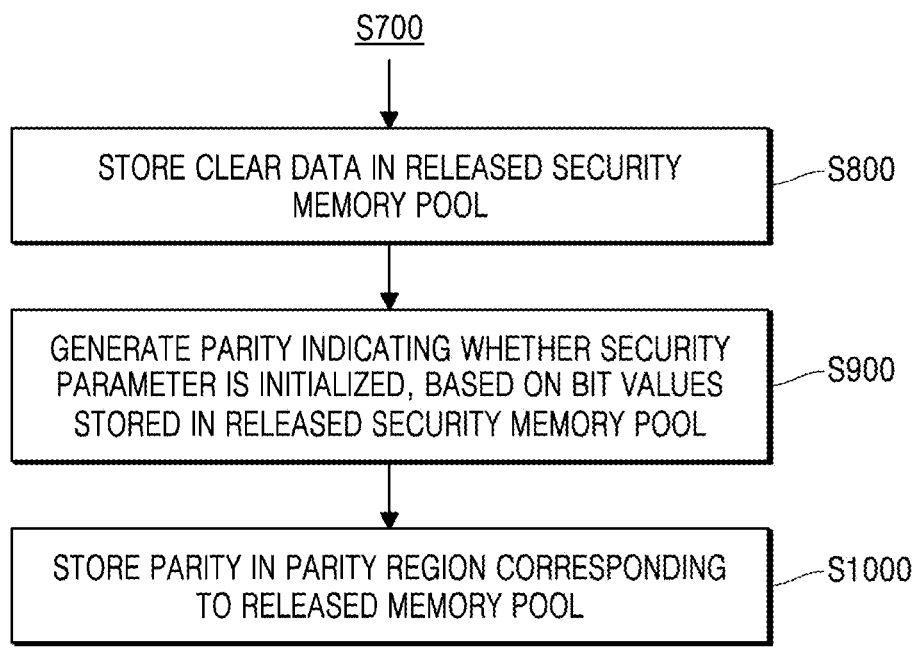
FIG. 7 is a flowchart for describing some example embodiments of storing a parity according to the inventive concepts.
Figure 8:
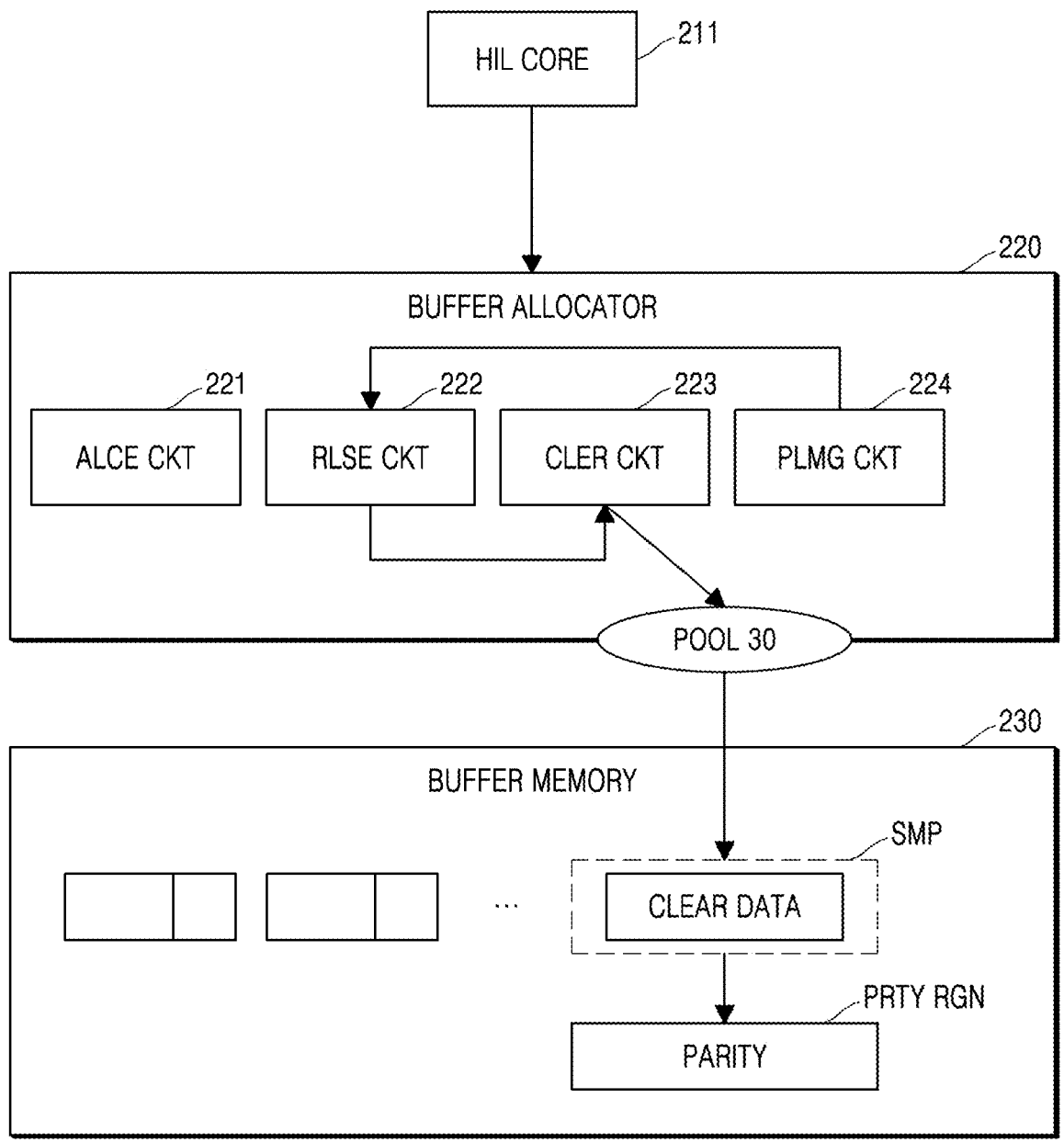
FIG. 8 is a block diagram of the embodiments of FIGS. 6 and 7.

FIG. 6 is a flowchart for describing some example embodiments of releasing an allocated security memory pool and initializing a security parameter according to the inventive concepts, FIG. 7 is a flowchart for describing some example embodiments of storing a parity according to the inventive concepts, and FIG. 8 is a block diagram of the embodiments of FIGS. 6 and 7.

Referring to FIG. 6, in some example embodiments, after the operation S400, an operation S500 of performing a security operation by using the security parameter may be performed. The operation S500 may be performed by the AES engine 240. An operation S600 of changing the security memory pool to be in an allocatable state by releasing the security memory pool after the security operation is completed may be performed. The operation S600 may be performed by the release circuit 222. An operation S700 of generating clear data including the bit values for initializing the value of the security parameter with reference to the security flag may be performed. The operation S700 may be performed by the clear handler circuit 223.

Referring to FIG. 7, in some example embodiments, after the operation S700, an operation S800 of storing the clear data in the released security memory pool may be performed. Next, an operation S900 of generating a parity indicating whether the security parameter is initialized, based on the bit values stored in the released security memory pool may be performed. Next, an operation S1000 of storing the parity in the parity region corresponding to the released memory pool may be performed. The operation S800, the operation S900, and the operation S1000 may be performed by the buffer memory 230.

Referring to FIG. 8, when the AES engine 240 performs a security operation and the security operation is completed, the HIL core 211 may output, to the buffer allocator 220, a start address of the security memory pool SMP and a third control signal indicating to release the security memory pool SMP. The pool management circuit 224 may manage the physical addresses of a plurality of memory pools, the sizes of the plurality of memory pools, and a security flag specifying the security memory pool SMP. The release circuit 222 may release and return the security memory pool based on the third control signal. Particularly, for example, the release circuit 222 may retrieve the security memory pool SMP from the pool management circuit 224 and change the security memory pool SMP to be in an allocatable state. When the security memory pool SMP is released, the clear handler circuit 223 may generate, with reference to the security flag from the pool management circuit 224, clears data (CLEAR DATA) including bit values for initializing the value of the security parameter (SECURITY PARAMETER). The HIL core 211 may output, to the buffer memory 230, a fourth control signal indicating to store the clear data (CLEAR DATA) in the released security memory pool SMP. Under the control by the HIL core 211, the clear data (CLEAR DATA) may be stored in a memory pool (e.g., the memory pool 30 (POOL 30)) released in the security memory pool SMP. In some example embodiments, the bit value of the clear data (CLEAR DATA) may be '0'. However, the inventive concepts are not limited thereto.

The buffer memory 230 may store a parity (PARITY) indicating whether the security parameter is initialized, based on the bit values stored in the released memory pool. In some example embodiments, the buffer memory 230 may generate a parity (PARITY) by performing an OR operation on all the bit values. The buffer memory 230 may store the parity (PARITY) in a parity region PRTY RGN corresponding to the security memory pool SMP.

According to some example embodiments, the security of the storage device 100 may be enhanced by initializing the security parameter (SECURITY PARAMETER) such as the CSP or the SSP after completing the security operation.

Figure 9:
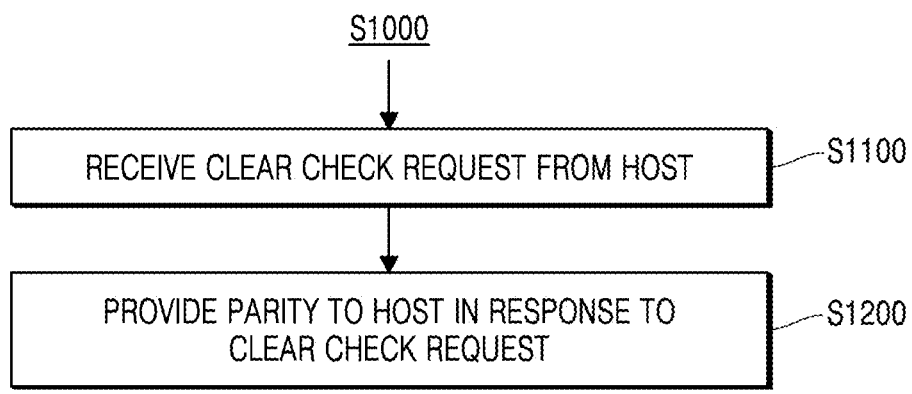
FIG. 9 is a flowchart for describing some example embodiments of checking whether a security parameter is initialized, according to the inventive concepts.

FIG. 9 is a flowchart for describing some example embodiments of checking whether a security parameter is initialized, according to the inventive concepts.

Referring to FIG. 9, in some example embodiments, after the operation S1000, an operation S1100 of receiving a clear check request from the host may be performed. An operation S1200 of providing the parity to the host in response to the clear check request may be performed. For example, based on the clear check request of the host 50, the HIL core 211 may output a fifth control signal indicating to read the parity to the buffer memory 230. Based on the fifth control signal, the buffer memory 230 may read a parity (PARITY) stored in the parity region PRTY RGN and output the parity (PARITY). The output parity (PARITY) may be transmitted to the host 50 through the HIL.

Figure 10:
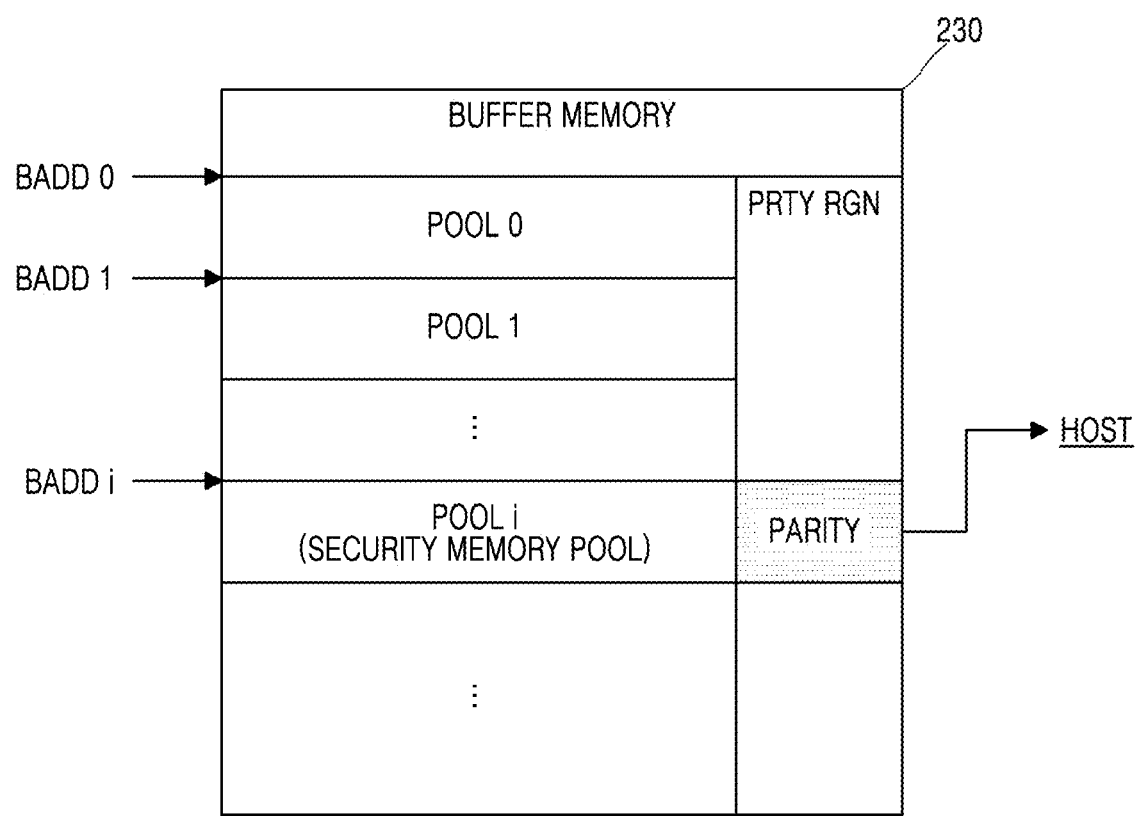
FIG. 10 is a block diagram of a buffer memory according to some example embodiments.

FIG. 10 is a block diagram of a buffer memory 230 according to some example embodiments.

Referring to FIG. 10, the buffer memory 230 may include a plurality of pools and a parity region PRTY RGN. The plurality of pools may include, for example, a memory pool 0 (POOL 0), a memory pool 1 (POOL 1), and a memory pool i (POOL i). Here, "i" may be an integer greater than or equal to 2. Each memory pool may have a size and physical addresses including a start address. For example, the start address of the memory pool 0 (POOL 0) may be a start address 0 (BADD 0), the start address of the memory pool 1 (POOL 1) may be a start address 1 (BADD 1), and the start address of the memory pool i (POOL i) may be a start address i (BADD i). Assuming that the memory pool i (POOL i) is allocated as the security memory pool (SECURITY MEMORY POOL), after the security parameter is used, the memory pool i (POOL i) may be released and returned, the clear data (CLEAR DATA) may be stored in the memory pool i (POOL i), and the parity (PARITY) corresponding to the result of an OR operation on the bit values (e.g., '0') of the clear data (CLEAR DATA) may be stored in the parity region PRTY RGN. According to the request of the host 50, the parity (PARITY) may be provided to the host 50.

According to some example embodiments, the security of the storage device 100 may be enhanced by checking whether the security parameter (SECURITY PARAMETER) is initialized.

Figure 11:
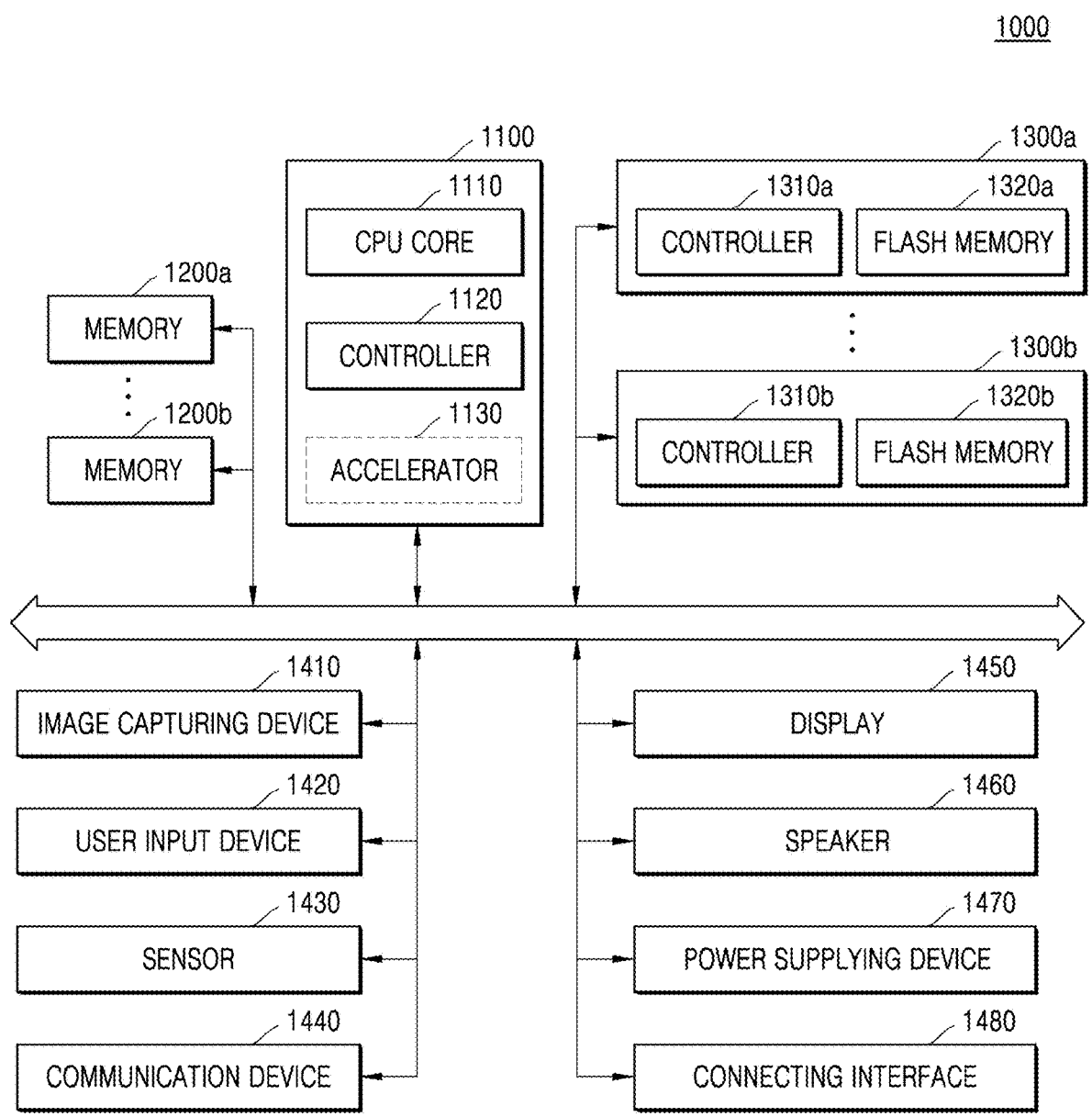
FIG. 11 is a diagram illustrating an electronic system according to embodiments.

FIG. 11 is a diagram illustrating an electronic system 1000 according to embodiments.

Referring to FIG. 11, the electronic system 1000 may include a mobile system, such as, but not limited to, a portable communication terminal (e.g., a mobile phone), a smartphone, a tablet personal computer (PC), a wearable device, a healthcare device, or an Internet of things (IoT) device. However, the electronic system 1000 is not limited to the mobile system and may include another electronic device, such as, but not limited to, a PC, a laptop computer, a server, a media player, or an automotive device (e.g., a navigation device).

The electronic system 1000 may include a main processor 1100, memories 1200a and 1200b, and storage devices 1300a and 1300b. Alternatively or additionally, the electronic system 1000 may include at least one of an image capturing device 1410, a user input device 1420, a sensor 1430, a communication device 1440, a display 1450, a speaker 1460, a power supplying device 1470, and a connecting interface 1480.

The main processor 1100 may control the operations of the electronic system 1000. Alternatively, or additionally, the main processor 1100 may control operations of other components included in the electronic system 1000. The main processor 1100 may be implemented as a general-purpose processor, a dedicated processor, and/or an application processor.

The main processor 1100 may include at least one central processing unit (CPU) core 1110 and further include a controller 1120 configured to control the memories 1200a and 1200b and/or the storage devices 1300a and 1300b. In some example embodiments, the main processor 1100 may further include an accelerator 1130, which may include a dedicated circuit for a high-speed data operation, such as, but not limited to, an artificial intelligence (AI) data operation. For example, the accelerator 1130 may include a graphics processing unit (GPU), a neural processing unit (NPU) and/or a data processing unit (DPU) and/or be implemented as a chip that is physically separated from the other components of the main processor 1100.

The memories 1200a and 1200b may be used as main memory devices of the electronic system 1000. Each of the memories 1200a and 1200b may include a volatile memory, such as, but not limited to, static random access memory (SRAM) and/or dynamic random access memory (DRAM), and/or a non-volatile memory, such as, but not limited to, a flash memory, phase-change RAM (PRAM), and/or resistive random access memory (RRAM). In some example embodiments, the memories 1200a and 1200b may be implemented in the same package as the main processor 1100.

The storage devices 1300a and 1300b may serve as non-volatile storage devices configured to store data regardless of whether power is supplied thereto, and may have a larger storage capacity than the memories 1200a and 1200b. The storage devices 1300a and 1300b may respectively include storage controllers 1310a and 1310b and flash memories 1320a and 1320b and be configured to store data via the control of the storage controllers 1310a and 1310b. Although the flash memories 1320a and 1320b may include vertical NAND (V-NAND) flash memories having a two-dimensional (2D) structure or a three-dimensional (3D) structure, the flash memories 1320a and 1320b may include other types of non-volatile memories (NVMs), such as PRAM and/or RRAM.

The storage devices 1300a and 1300b may be physically separated from the main processor 1100 and be included in the electronic system 1000 and/or implemented in the same package as the main processor 1100. Alternatively, or additionally, the storage devices 1300a and 1300b may have types of SSDs or memory cards and may be removably combined with other components of the electronic system 1000 through an interface, such as a connecting interface 1480 that is described below. The storage devices 1300a and 1300b may be devices to which a standard protocol, such as, but not limited to, UFS, eMMC, NVMe, and the like may be applied, without being limited in this regard.

The image capturing device 1410 may capture still images and/or moving images. The image capturing device 1410 may include, but not be limited to, a camera, a camcorder, and/or a webcam. The user input device 1420 may receive various types of data input by a user of the electronic system 1000 and may include, but not be limited to, a touch pad, a keypad, a keyboard, a mouse, and a microphone. The sensor 1430 may detect various types of physical quantities, which may be obtained from the outside of the electronic system 1000, and convert the detected physical quantities into electric signals. For example, the sensor 1430 may include, but not be limited to, a temperature sensor, a pressure sensor, an illuminance sensor, a position sensor, an acceleration sensor, a biosensor, and/or a gyroscope sensor. The communication device 1440 may transmit and/or receive signals between other devices outside the electronic system 1000, according to various communication protocols. The communication device 1440 may include, but not be limited to, an antenna, a transceiver, and/or a modem.

The display 1450 and the speaker 1460 may serve as output devices configured to respectively output visual information and auditory information to the user of the electronic system 1000. The power supplying device 1470 may appropriately convert power supplied from a battery (not shown) embedded in the electronic system 1000 and/or an external power source and supply the converted power to each of components of the electronic system 1000. The connecting interface 1480 may provide connection between the electronic system 1000 and an external device, which may be connected to the electronic system 1000 and capable of transmitting and/or receiving data to and/or from the electronic system 1000. The connecting interface 1480 may be implemented by using various interface schemes, such as, but not limited to, ATA, SATA, e-SATA, SCSI, SAS, PCI, PCIe, NVMe, FireWire, a USB interface, a SD card interface, an MMC interface, an eMMC interface, a UFS interface, an embedded UFS (eUFS) interface, and a CF card interface.

Figure 12:
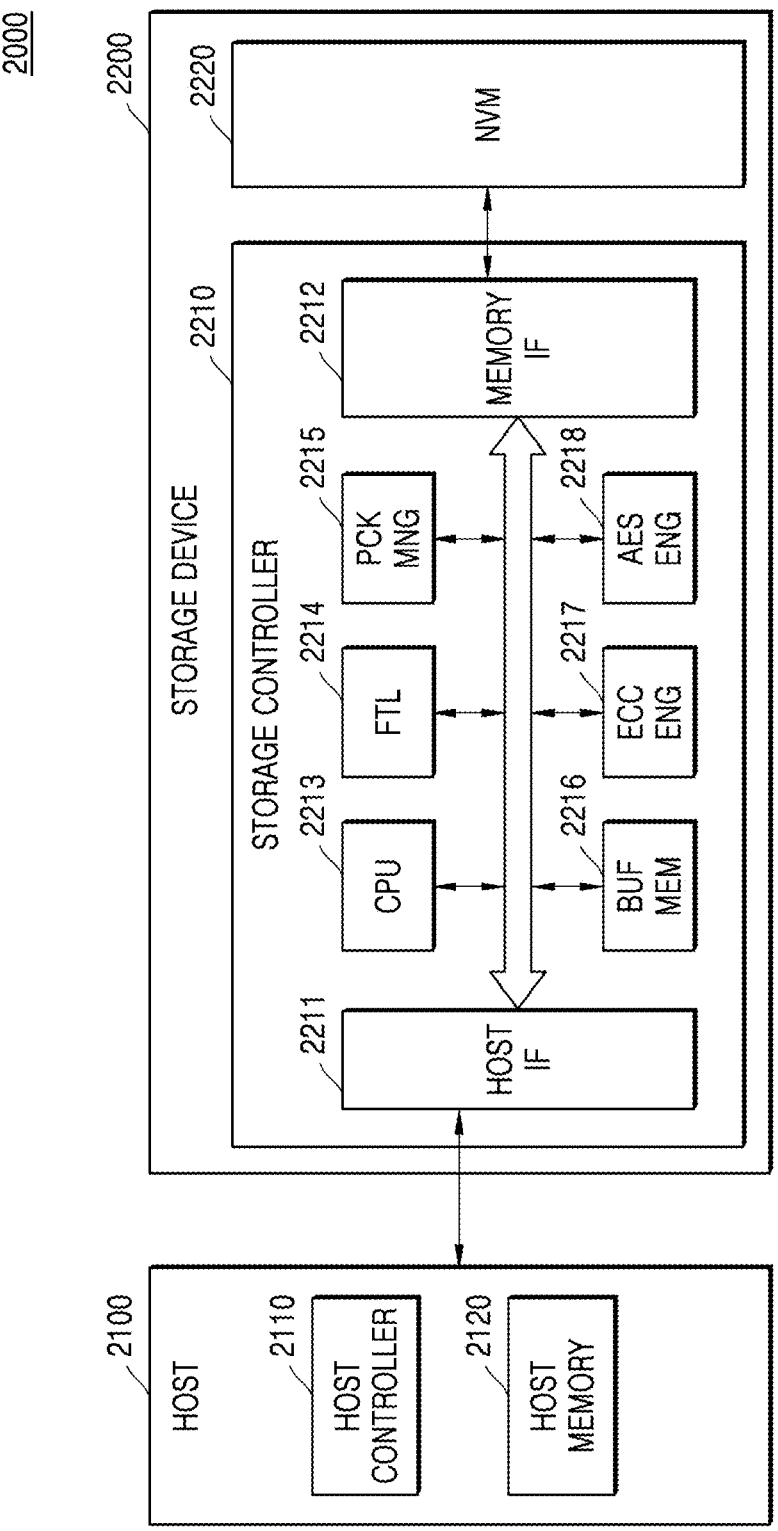
FIG. 12 is a block diagram for describing an interface of a storage system according to some example embodiments.

FIG. 12 is a block diagram for describing an interface of a storage system 2000 according to some example embodiments.

Referring to FIG. 12, the storage system 2000 may include a host 2100 and a storage device 2200. In some example embodiments, the storage device 2200 may include a storage controller 2210 and a non-volatile memory (e.g., NVM 2220). In an optional or additional embodiment, the host 2100 may include a host controller 2110 and a host memory 2120. The host memory 2120 may serve as a buffer memory configured to temporarily store data to be transmitted to the storage device 2200 and/or data transmitted from the storage device 2200.

The storage device 2200 may include storage media configured to store data in response to requests from the host 2100. For example, the storage device 2200 may include at least one of an SSD, an embedded memory, and a detachable external memory. When the storage device 2200 is the SSD, the storage device 2200 may be a device that conforms to an NVMe standard, for example. Alternatively, or additionally, when the storage device 2200 is an embedded memory or an external memory, the storage device 2200 may be a device that conforms to a UFS standard or an eMMC standard. Each of the host 2100 and the storage device 2200 may generate a packet according to an adopted standard protocol and transmit the packet.

When the NVM 2220 of the storage device 2200 may include a flash memory, the flash memory may include a 2D NAND memory array or a 3D (or vertical) NAND (VNAND) memory array. Alternatively, or additionally, the storage device 2200 may include various other types of non-volatile memories. For example, the storage device 2200 may include, but not be limited to, MRAM, spin-transfer torque MRAM (STT-MRAM), conductive bridging RAM (CBRAM), ferroelectric RAM (FRAM), PRAM, and RRAM.

According to some example embodiments, the host controller 2110 and the host memory 2120 may be implemented as separate semiconductor chips. Alternatively, or additionally, in some example embodiments, the host controller 2110 and the host memory 2120 may be integrated into the same semiconductor chip. For example, the host controller 2110 may include any one of a plurality of modules included in an application processor. For another example, the application processor may be implemented as a System on Chip (SoC). Alternatively, or additionally, the host memory 2120 may be an embedded memory included in the application processor or a non-volatile memory or a memory module, which may be outside the application processor.

The host controller 2110 may manage an operation of storing data (e.g., write data) of a buffer region of the host memory 2120 in the non-volatile memory 2220 and/or storing data (e.g., read data) of the non-volatile memory 2220 in the buffer region.

The storage controller 2210 may include a host interface 2211, a memory interface 2212, and a CPU 2213. In some example embodiments, the storage controller 2210 may further include a flash translation layer (FTL) 2214, a packet manager 2215, a buffer memory 2216, an ECC engine 2217, and an advanced encryption standard (AES) engine 2218. The storage controller 2210 may further include a working memory (not shown) in which the FTL 2214 is loaded. The CPU 2213 may execute the FTL 2214 to control write and read operations on the NVM 2220.

The host interface 2211 may transmit and/or receive packets to and/or from the host 2100. A packet transmitted from the host 2100 to the host interface 2211 may include a command and/or data to be written the non-volatile memory 2220. A packet transmitted from the host interface 2211 to the host 2100 may include a response to the command and/or data read from the non-volatile memory 2220. The memory interface 2212 may transmit data to be written to the non-volatile memory 2220 and/or receive data read from the non-volatile memory 2220. The memory interface 2212 may be configured to comply with one or more standard protocols, such as, but not limited to, Toggle and/or open NAND flash interface (ONFI).

The FTL 2214 may perform various functions, such as, but not limited to, an address mapping operation, a wear-leveling operation, and a garbage collection operation. The address mapping operation may refer to an operation of converting a logical address received from the host 2100 into a physical address used to physically store data in the non-volatile memory 2220. The wear-leveling operation may refer to a technique for preventing or reducing excessive deterioration of a specific block by allowing blocks of the non-volatile memory 2220 to be uniformly used. For example, the wear-leveling operation may be implemented using a firmware technique that balances erase counts of physical blocks. The garbage collection operation may refer to a technique for ensuring usable capacity in the non-volatile memory 2220 by erasing an existing block after copying valid data of the existing block to a new block.

The packet manager 2215 may generate a packet according to a protocol of an interface, which interfaces with the host 2100, and/or parse various types of information from the packet received from the host 2100.

Alternatively, or additionally, the buffer memory 2216 may temporarily store data to be written to the NVM 2220 and/or data to be read from the NVM 2220. Although, in some example embodiments, the buffer memory 2216 may be a component included in the storage controllers 2210, the buffer memory 2216 may be outside the storage controllers 2210.

In some example embodiments, the buffer memory 2216 may be corresponding to the buffer memory 230 of FIG. 2, example embodiments of the present disclosure may be applied to the buffer memory 2216.

The ECC engine 2217 may perform error detection and correction operations on read data read from the NVM 2220. For example, the ECC engine 2217 may generate parity bits for write data to be written to the NVM 2220, and the generated parity bits may be stored in the NVM 2220 together with write data. During the reading of data from the NVM 2220, the ECC engine 2217 may correct an error in the read data by using the parity bits read from the NVM 2220 along with the read data, and output error-corrected read data.

The AES engine 2218 may perform, by using a symmetric-key algorithm, at least one of an encryption operation and a decryption operation on data input to the storage controllers 2210.

In some example embodiments, the AES engine 2218 may be corresponding to the AES engine 240 of FIG. 2, example embodiments of the present disclosure may be applied to the AES engine 2218.

As described herein, any electronic devices and/or portions thereof according to any of the example embodiments may include, may be included in, and/or may be implemented by one or more instances of processing circuitry such as hardware including logic circuits; a hardware/software combination such as a processor executing software; or any combination thereof. For example, the processing circuitry more specifically may include, but is not limited to, a central processing unit (CPU), an arithmetic logic unit (ALU), a graphics processing unit (GPU), an application processor (AP), a digital signal processor (DSP), a microcomputer, a field programmable gate array (FPGA), and programmable logic unit, a microprocessor, application-specific integrated circuit (ASIC), a neural network processing unit (NPU), an Electronic Control Unit (ECU), an Image Signal Processor (ISP), and the like. In some example embodiments, the processing circuitry may include a non-transitory computer readable storage device (e.g., a memory), for example a DRAM device, storing a program of instructions, and a processor (e.g., CPU) configured to execute the program of instructions to implement the functionality and/or methods performed by some or all of any devices, systems, modules, units, controllers, circuits, architectures, and/or portions thereof according to any of the example embodiments, and/or any portions thereof.

It may be apparent to those of ordinary skill in the art that the structure of the inventive concepts may be variously modified or changed without departing from the scope of the inventive concepts. In view of the foregoing, when modifications and changes of the inventive concepts fall within the scope of the appended claims and equivalents thereof, the inventive concepts may be construed as including the modifications and changes of the inventive concepts.

While the inventive concepts have been particularly shown and described with reference to example embodiments thereof, it will be understood that various changes in form and details may be made therein without departing from the spirit and scope of the following claims.

What is claimed is:

1. A memory controller comprising:
   a buffer memory including a plurality of memory pools;
   a buffer allocator configured to allocate, based on a first control signal, a security memory pool to store modified secret information among the plurality of memory pools; and
   a processor configured to
      receive, from a host, a command including secret information,
      output the first control signal to the buffer allocator based on the command,
      modify the secret information based on a cryptography algorithm, and
      output, to the buffer memory, a second control signal indicating to store a security parameter including the modified secret information in the security memory pool,
   wherein the buffer allocator comprises:
      a clear handler circuit configured to generate clear data including bit values for initializing a value of the security parameter with reference to a security flag specifying the security memory pool, in response to the security memory pool being released.

2. The memory controller of claim 1, wherein the buffer allocator comprises:
   a pool management circuit configured to manage physical addresses of the plurality of memory pools and sizes of the plurality of memory pools; and
   an allocation circuit configured to allocate the security memory pool by designating a start address corresponding to a first address among physical addresses of an available memory pool in the pool management circuit, a size of the available memory pool, and the security flag specifying the available memory pool.

3. The memory controller of claim 1, wherein the processor is configured to output a start address of the security memory pool and a third control signal indicating to release the security memory pool, and
   the buffer allocator is configured to release and return the security memory pool based on the third control signal.

4. The memory controller of claim 3, wherein the buffer allocator comprises:
   a pool management circuit configured to manage physical addresses of the plurality of memory pools, sizes of the plurality of memory pools, and the security flag specifying the security memory pool; and
   a release circuit configured to retrieve the security memory pool from the pool management circuit and change the security memory pool to be in an allocatable state.

5. The memory controller of claim 4, wherein the processor is configured to output, to the buffer memory, a fourth control signal indicating to store the clear data in the released security memory pool.

6. The memory controller of claim 5, wherein the buffer memory is configured to store a parity indicating whether the security parameter is initialized, based on the bit values stored in the released security memory pool.

7. The memory controller of claim 6, wherein the buffer memory is configured to generate the parity by performing an OR operation on the bit values.

8. The memory controller of claim 7, wherein the processor is configured to output, to the buffer memory, a fifth control signal indicating to read the parity, in response to a clear check request received from the host, and
   the buffer memory is configured to output the parity based on the fifth control signal.

9. An operating method of a memory controller, the operating method comprising:
   receiving secret information from a host;
   allocating a security memory pool to store the secret information among a plurality of memory pools of a buffer memory;

modifying the secret information based on a cryptography algorithm;

storing a security parameter including the modified secret information in the security memory pool; and generating clear data including bit values for initializing a value of the security parameter with reference to a security flag specifying the security memory pool, in response to the security memory pool being released.

10. The operating method of claim 9, wherein the allocating of the security memory pool comprises:

retrieving a start address of an available memory pool among the plurality of memory pools and a size of the available memory pool; and designating the start address, the size, and the security flag specifying the available memory pool.

11. The operating method of claim 10, further comprising:

performing a security operation by using the security parameter; and changing the security memory pool to be in an allocatable state by releasing the security memory pool after the security operation is completed.

12. The operating method of claim 11, further comprising:

storing the clear data in the released security memory pool;

generating a parity indicating whether the security parameter is initialized, based on the bit values stored in the released security memory pool; and storing the parity in a parity region corresponding to the released security memory pool.

13. The operating method of claim 12, further comprising:

receiving a clear check request from the host; and providing the parity to the host in response to the clear check request.

14. A storage device comprising:

a nonvolatile memory comprising a plurality of memory cells; and a memory controller configured to receive, from a host, a command including secret information, and allocate, based on the command, a security memory pool to temporarily store the secret information, wherein the memory controller comprises a buffer allocator including:

a clear handler circuit configured to generate clear data including bit values for initializing a value of the secret information with reference to a security flag specifying the security memory pool, in response to the security memory pool being released.

15. The storage device of claim 14, wherein the memory controller comprises:

a buffer memory including a plurality of memory pools;

the buffer allocator configured to allocate the security memory pool among the plurality of memory pools based on a first control signal; and a processor configured to output the first control signal to the buffer allocator based on the command, modify the secret information based on a cryptography algorithm, and output, to the buffer memory, a second control signal indicating to store a security parameter including the modified secret information in the security memory pool.

16. The storage device of claim 15, wherein the buffer allocator comprises:

a pool management circuit configured to manage physical addresses of the plurality of memory pools and sizes of the plurality of memory pools; and an allocation circuit configured to allocate the security memory pool by designating a start address corresponding to a first address among physical addresses of an available memory pool in the pool management circuit, a size of the available memory pool, and the security flag specifying the available memory pool.

17. The storage device of claim 15, wherein the processor is configured to output a start address of the security memory pool and a third control signal indicating to release the security memory pool, and the buffer allocator is configured to release and return the security memory pool based on the third control signal.

18. The storage device of claim 17, wherein the buffer allocator comprises:

a pool management circuit configured to manage physical addresses of the plurality of memory pools, sizes of the plurality of memory pools, and the security flag specifying the security memory pool; and a release circuit configured to retrieve the security memory pool from the pool management circuit and change the security memory pool to be in an allocatable state.

19. The storage device of claim 18, wherein the processor is configured to output, to the buffer memory, a fourth control signal indicating to store the clear data in the released security memory pool, and the buffer memory is configured to store a parity indicating whether the security parameter is initialized, based on the bit values stored in the released security memory pool.

20. The storage device of claim 19, wherein the processor is configured to output a fifth control signal indicating to read the parity, to the buffer memory in response to a clear check request received from the host, and the buffer memory outputs the parity based on the fifth control signal.

* * * * *